United States Patent [19]

Moriyama et al.

[11] 3,916,323

[45] Oct. 28, 1975

[54] INFORMATION STORAGE AND TRANSFER SYSTEM

[75] Inventors: Hiromi Moriyama, Fujisawa; Motosuke Kuwabara, Yokohama; Katsuyuki Jin, Kawasaki, all of Japan

[73] Assignee: Hitachi, Ltd., Japan

[22] Filed: Mar. 22, 1974

[21] Appl. No.: 453,861

[30] Foreign Application Priority Data

Mar. 26, 1973 Japan .............................. 48-33608

[52] U.S. Cl. .......... 328/37; 235/91 PR; 235/92 SH; 307/221 R; 340/174 SR; 328/49

[51] Int. Cl.$^{2}$ ..................... G11C 9/02; G11C 19/00

[58] Field of Search........... 307/221 R, 224; 328/37, 328/49–51, 75; 340/173 RC, 174 SR, 91 PR, 92 SH

[56] References Cited

UNITED STATES PATENTS

| | | | |
|---|---|---|---|
| 3,200,264 | 10/1965 | Lindenthal et al. | 307/221 R |
| 3,708,690 | 1/1973 | Paivinen | 235/92 SH |
| 3,781,821 | 12/1973 | Roth | 328/37 X |

*Primary Examiner*—John Zazworsky
*Attorney, Agent, or Firm*—Craig & Antonelli

[57] ABSTRACT

In a system for transferring information stored in a first shift register to a second shift register, information is transferred from the first shift register to the second shift register with timing different from the timing with which the information is stored in the first shift register.

9 Claims, 2 Drawing Figures

INFORMATION STORAGE AND TRANSFER SYSTEM

This invention relates to an information storage and transfer system using shift registers.

There are various kinds of systems for transferring information received and stored in a unit to another unit, and shift registers are used in one of such systems. According to this system, a first and a second shift register are connected in series so that information applied to and stored in the first shift register can be transferred to the second shift register. A feedback route connecting the output of the first shift register to the input thereof is provided when it is desired to store the information in the first shift register again, so that the information can be fed back to the input of the first shift register by the feedback route simultaneously with the transfer of the information to the second shift register and such information can be stored in the first shift register after the transfer of the information to the second shift register. This system has been widely employed hitherto due to the advantage that only a single data transfer path is required although the period of time required for the data transfer is greater than in the system in which a plurality of data transfer paths are provided for the parallel transfer of individual bits of binary coded information. However, this system has been defective in that erroneous information may be stored or transferred when the timing of transferring the information to the second shift register is random relative to the timing of receiving the information by the first shift register and the former timing overlaps the latter timing.

It is therefore a primary object of the present invention to provide an information storage and transfer system using shift registers which is free from maloperation of erroneously storing and transferring information.

The system according to the present invention is featured by the fact that information is transferred from a first shift register to a second shift register with timing which differs from the timing with which such information is stored in the first shift register.

Figure 1:
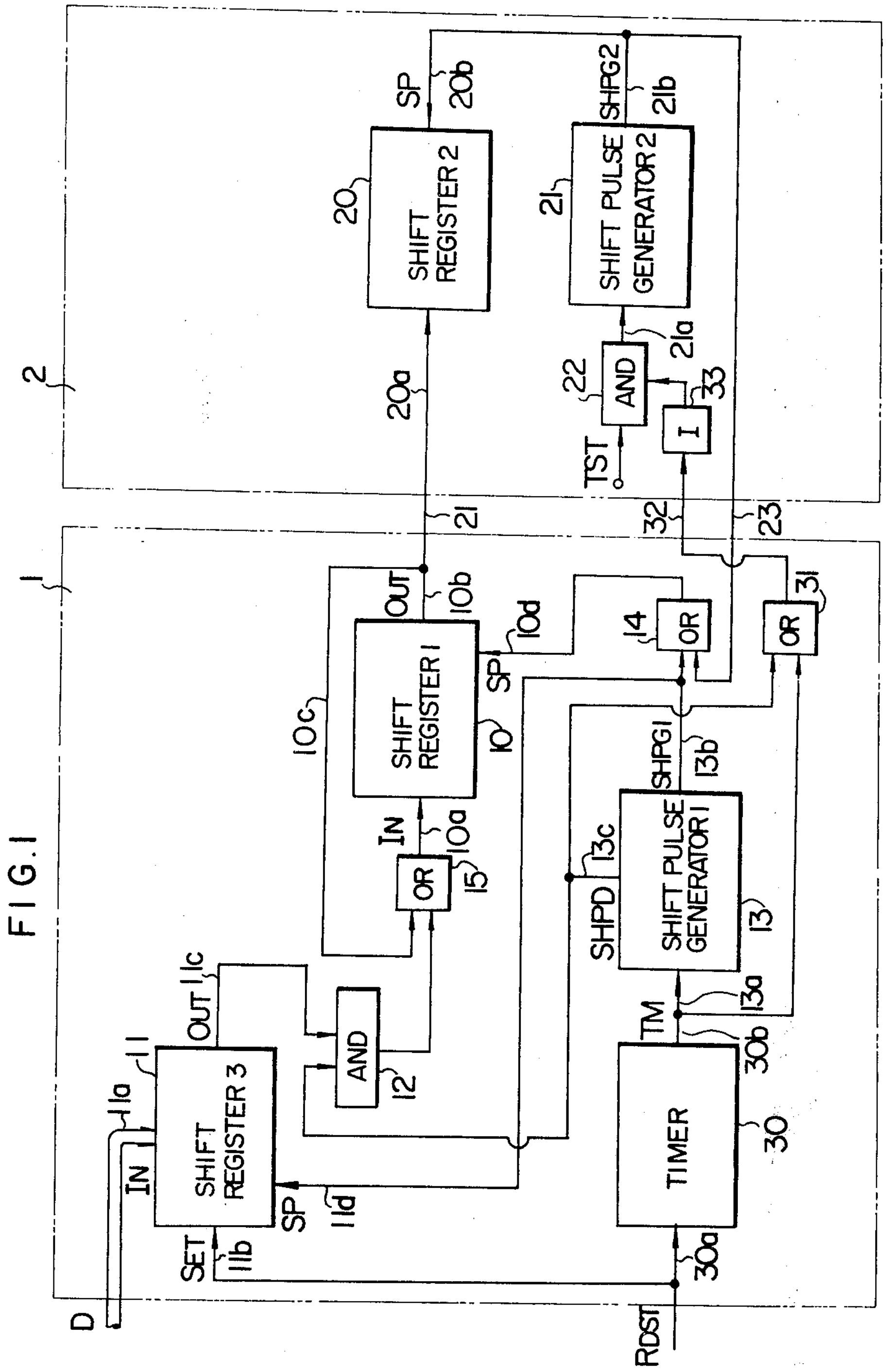
Figure 2:
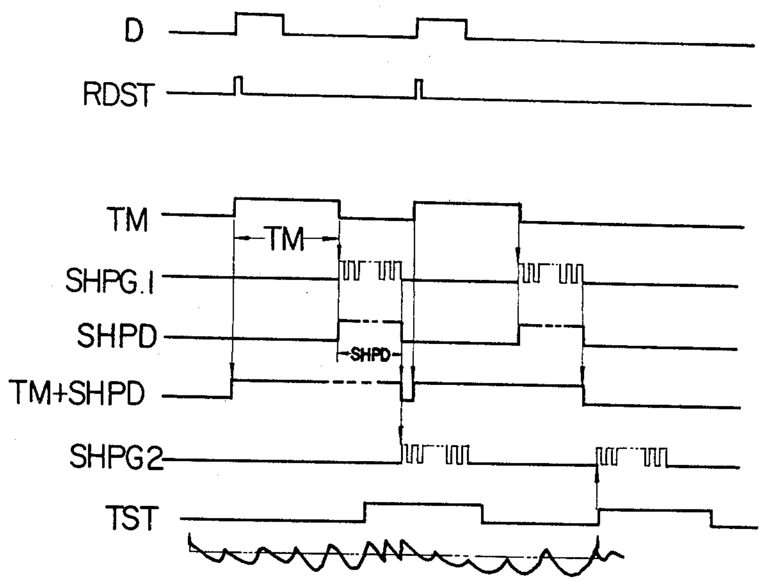

The above and other objects, features and advantages of the present invention will be apparent from the following detailed description of a preferred embodiment thereof taken in conjunction with the accompanying drawings, in which:

FIG. 1 is a block diagram of a preferred embodiment of the information storage and transfer system according to the present invention; and FIG. 2 shows operating waveforms appearing at various parts of the system shown in FIG. 1.

Referring to FIG. 1, a first shift register 10 in a unit A generally designated by the reference numeral 1 is connected by an information transfer line 21 to a second shift register 20 in another unit B generally designated by the reference numeral 2. The unit A includes another shift register 11 which serves as a received information buffer. An input line 11a connects this shift register 11 to a source of information D, another input line 11*b* applies a read starting instruction signal RDST to this shift register 11, and an output line 11c connects this shift register 11 to an AND gate 12. A first shift pulse generator 13 is connected by a line 13*c* to the AND gate 12 to apply to the AND gate 12 another input which is a signal SHPD indicating the fact that the first shift pulse generator 13 is generating a shift pulse signal SHPG1. A shift pulse output line 13*b* of the first shift pulse generator 13 is connected to a shift pulse input line 11*d* of the shift register 11 for applying shift pulses SP to the shift register 11 and to a shift pulse input line 10*d* of the first shift register 10 through an OR gate 14 for applying shift pulses SP to the first shift register 10. The output of the AND gate 12 is applied to the first shift register 10 through an OR gate 15. An output line 10*b* of the first shift register 10 is connected to the OR gate 15 through a feedback line 10c for applying another input to the OR gate 15, and to the second shift register 20 through the information transfer line 21 and an input line 20*a*.

The read starting instruction signal RDST is also applied to a timer 30 through an input line 30*a*. An output line 30*b* of the timer 30 is connected to an input line 13*a* of the first shift pulse generator 13 for applying an output signal TM of the timer 30 to the first shift pulse generator 13. This output line 30*b* is connected also to an OR gate 31. The output of the OR gate 31 is applied by a lead 32 to an inverter 33. The output of the inverter 33 is applied to an AND gate 22. A transfer starting instruction signal TST is applied to the AND gate 22 as another input thereto. The output of the AND gate 22 is connected to an input line 21*a* of a second shift pulse generator 21 which generates a shift pulse signal SHPG2. An output line 21*b* of the second shift pulse generator 21 is connected to a shift pulse input line 20*b* of the second shift register 20 for applying shift pulses SP to the second shift register 20. This output line 21*b* is also connected by a lead 23 to the OR gate 14 to apply another input to the OR gate 14.

Each of the shift registers 10, 11 and 20 has a capacity corresponding to the number of bits forming one unit such as one character or one word in the information. Further, the shift pulse generators 13 and 21 have such an operating function that shift pulses whose number is equal to the number of bits appear on the output lines 13*b* and 21*b* in response to the application of a trigger input to the input lines 13*a* and 21*a* respectively.

The operation of the system will now be described with reference to FIG. 2. In response to the application of the information D and read starting instruction signal RDST to the shift register 11 and timer 30, individual bits of the information D are parallelly set in the shift register 11, and at the same time, the timer 30 is actuated to deliver the output signal TM which lasts for a predetermined period of time. The duration of this output signal TM is selected to be longer than the period of time required for the transfer of the information from the first shift register 10 to the second shift register 20 as described later. The output signal TM of the timer 30 is applied through the OR gate 31 to the inverter 33 to be inverted thereby, and the inverted output of the inverter 33 is applied to the AND gate 22 to close the AND gate 22 for the predetermined period of time above described so that the second shift pulse generator 21 may not be triggered by the transfer starting instruction signal TST during such period of time. When the waveform of the output signal TM of the timer 30 starts to fall, that is, when the predetermined period of time above described has elapsed after the application of the read starting instruction signal RDST, the first shift pulse generator 13 is triggered to generate the shift pulse signal SHPG1 including a predetermined number of shift pulses SP. During the period of time in which this shift pulse signal SHPG1 lasts, the signal SHPD indicating the operation of the first shift pulse generator 13 appears on the output line 13*c* and is applied to the AND gate 12 to open this AND gate 12. Therefore, the shift pulse signal SHPG1 is applied to the shift register 11 and to the first shift register 10 through the OR gate 14 so that the information stored in the shift register 11 is shifted one bit after another into the first shift register 10 through the OR gate 15.

The signal SHPD is also applied to the OR gate 31. Thus, the AND gate 22 is maintained in the closed position even after the disappearance of the output of the timer 30 so long as the first shift pulse generator 13 continues to operate, that is, so long as the information is being stored in the first shift register 10.

The AND gate 22 is opened when the shift pulse generating operation of the first shift pulse generator 13 ceases, that is, when the storage of the information in the first shift register 10 is completed and the signal SHPD disappears. Therefore, in response to the application of the transfer starting instruction signal TST to the AND gate 22, the second shift pulse generator 21 is triggered to generate the shift pulse signal SHPG2 and the information stored in the first shift register 10 is transferred to the second shift register 20. Even when the next information D and read starting instruction signal RDST may appear during this transfer operation, the transfer of the information from the first shift register 10 to the second shift register 20 can be completed without any obstruction due to the fact that the shift pulse generating operation of the first shift pulse generator 13 is delayed by the predetermined period of time by the action of the timer 30.

What is claimed is:

1. An information storage and transfer system comprising:

first, second and third shift registers, said third shift register for temporarily storing incoming information, said first shift register for receiving and storing the information stored in said third shift register, and said second shift register for receiving and storing the information stored in said first shift register;

first control means for controlling the transfer of the information stored in said third shift register to said first shift register;

second control means for controlling the transfer of the information stored in said first shift register to said second shift register; and third control means for controlling said first and second control means so that said first and second control means do not operate simultaneously, said third control means including timing means responsive to a read starting instruction which initiates the storing of the incoming information in said third shift register for controlling the driving of said first control means for a longer time than the time required for transferring information to said second shift register from said first shift register, and means for restricting the operation of said second control means during the operation of said first control means.

2. A system according to claim 1, wherein said first shift register is provided with a feedback route from the output to the input thereof.

3. A system according to claim 1, wherein said first control means includes a first shift pulse generator for generating a first shift pulse for controlling the transfer of information to said first shift register from said third shift register and said second control means includes a second shift pulse generator for generating a second shift pulse for controlling the transfer of information to said second shift register from said first shift register, and OR gate means connected to the outputs of said first and second shift pulse generators, a shifting instruction being applied through said OR gate means to said first shift register.

4. A system according to claim 1, wherein said means for restricting the operation of said second control means during the operation of said first control means includes gate means for restricting the operation of said second shift pulse generator during the time said first shift pulse generator is generating shift pulses.

5. A system according to claim 3, wherein said timing means serves for preventing said first shift pulse generator from operating so as to permit said second shift pulse generator to generate said second shift pulse, said timing means including a timer triggered by the read starting instruction for generating an output signal for a predetermined period of time which is longer than the period of time of the second shift pulses.

6. A system according to claim 5, wherein said means for restricting the operation of said second control means during the operation of said first control means includes gate means for restricting the operation of said second shift pulse generator during the period in which said first shift pulse generator is generating shift pulses.

7. A system according to claim 6, wherein said first register is provided with a feedback route from the output to the input thereof.

8. A system according to claim 7, wherein said first control means further includes an AND gate receiving an output from said third shift register and a signal indicative of said first shift pulse generator generating shift pulses and providing an output to an OR gate, said OR gate being provided in the feedback route of said first shift register and also receiving the output of said first shift register, said OR gate providing an output to the input of said first shift register.

9. A system according to claim 8, wherein said gate means for restricting the operation of said second shift pulse generator during the period that said first shift pulse generator is generating shift pulses includes an OR gate receiving a signal indicative of said first shift pulse generator generating shift pulses and the output signal of said timer, said OR gate providing an output to an inverter which provides an output to an AND gate connected to the input of said second shift pulse generator, said AND gate also receiving an input of a transfer start signal whereby said second shift pulse generator generates said second shift pulses in response to the presence of the transfer start signal and the absence of a signal at the output of said OR gate.

* * * * *